United States Patent
Wang et al.

(10) Patent No.: US 10,237,468 B2
(45) Date of Patent: Mar. 19, 2019

(54) METHOD AND APPARATUS FOR ENABLING PRECISE FOCUSING

(71) Applicant: JRD COMMUNICATION (SHENZHEN) LTD, Shenzhen, Guangdong (CN)

(72) Inventors: Jia Wang, Shenzhen (CN); Ling Ma, Shenzhen (CN)

(73) Assignee: JRD COMMUNICATION (SHENZHEN) LTD, Shenzhen (CN)

(*) Notice: Subject to any disclaimer, the term of this patent is extended or adjusted under 35 U.S.C. 154(b) by 0 days.

(21) Appl. No.: 15/555,534

(22) PCT Filed: Nov. 1, 2016

(86) PCT No.: PCT/CN2016/104199
§ 371 (c)(1),
(2) Date: Sep. 4, 2017

(87) PCT Pub. No.: WO2017/157024
PCT Pub. Date: Sep. 21, 2017

(65) Prior Publication Data
US 2018/0109717 A1  Apr. 19, 2018

(30) Foreign Application Priority Data

Mar. 15, 2016 (CN) .......................... 2016 1 0149568

(51) Int. Cl.
*H04N 5/232* (2006.01)
*G03B 13/00* (2006.01)
(Continued)

(52) U.S. Cl.
CPC ......... *H04N 5/23212* (2013.01); *G06T 7/571* (2017.01); *H04N 5/232123* (2018.08); *G02B 7/36* (2013.01)

(58) Field of Classification Search
CPC ............. H04N 5/23212; H04N 5/2356; H04N 5/232123; G02B 7/28; G02B 7/36;
(Continued)

(56) References Cited

U.S. PATENT DOCUMENTS 7,596,310 B2 * 9/2009 Ono ......................... G02B 7/28
348/345
7,738,784 B2 * 6/2010 Nakai ................ H04N 5/23212
396/263
(Continued)

FOREIGN PATENT DOCUMENTS

CN 102419505 A 4/2012
CN 102843508 A 12/2012
(Continued)

*Primary Examiner* — Ngoc Yen T Vu (57) ABSTRACT

Method and apparatus for enabling precise focusing are provided. The method includes obtaining an operation time of the photographing device in real time by a processor, searching a relationship table of preset times and focus range based on the obtained operation time to obtain a focus range corresponding to the obtained operation time; sending the obtained focus range to a driver by the processor, adjusting the distance between a lens and an image sensor based on the focus range by the driver, so that the lens may be located in the focus range, and to adjust the focus range in real time and improve the accuracy of focusing between the lens and the image sensor.

11 Claims, 4 Drawing Sheets

(51) Int. Cl.
*G06T 7/571* (2017.01)
*G02B 7/36* (2006.01)

(58) Field of Classification Search
CPC .......... G03B 3/02; G03B 13/20; G03B 13/36; G06T 2207/10148; G06T 7/55; G06T 7/571
USPC .......................................... 348/345, 349–350
See application file for complete search history.

(56) References Cited

U.S. PATENT DOCUMENTS

| | | | |
|---|---|---|---|
| 7,929,044 B2* | 4/2011 | Chen ................. | H04N 5/23212 |
| | | | 348/345 |
| 8,436,934 B2* | 5/2013 | Chou .................... | G03B 13/00 |
| | | | 348/347 |
| 9,638,984 B2* | 5/2017 | Lou ........................ | G02B 7/285 |
| 9,936,120 B2* | 4/2018 | Ishihara ............. | H04N 5/23212 |
| 2011/0019015 A1 | 1/2011 | Takanashi | |

FOREIGN PATENT DOCUMENTS

| | | |
|---|---|---|
| CN | 103986877 A | 8/2014 |
| CN | 104238236 A | 12/2014 |
| CN | 104796616 A | 7/2015 |
| CN | 105100617 A | 11/2015 |
| JP | 2005003693 A | 1/2005 |

* cited by examiner

METHOD AND APPARATUS FOR ENABLING PRECISE FOCUSING

TECHNICAL FIELD

This disclosure relates generally to the field of photography, and more particularly, to method and apparatus for enabling precise focusing.

BACKGROUND

Currently, users may use mobile devices such as photographing devices in daily life. Existing mobile devices may be equipped with one or more photographing functions. The one or more photographing functions of existing mobile devices grow fast and have developed from 0.2 mega pixels to 21 mega pixels, which become a selling point for mobile devices.

The photographing function of mobile devices may not only have a high definition, sharp focusing may also be an important part. Sharp and precise focusing may greatly impact image quality. Focusing is to adjust the distance between the lens of the mobile device and the image sensor so that the photographic subject is clearly imaged on the plane of the image sensor of the mobile device.

Temperature of mobile devices may increase due to the mobile devices working in long hours. Increased temperature of the mobile devices may broaden the range of focusing, so as to impact the focusing accuracy of the mobile devices.

SUMMARY

A principal technical problem to be addressed by the disclosure is to provide a method and an apparatus for enabling precise focusing to solve the problems as described above.

According to an aspect of the disclosure, a method for enabling precise focusing is provided. The method is used within a photographing device that includes a lens, an image sensor, a processor, a motor, and a driver, wherein the processor is coupled to the image sensor and the driver, respectively, wherein the driver is configured to drive the motor, and wherein the motor is configured to adjust a distance between the lens and the image sensor, the method comprising: obtaining, using the processor, an operation time of the photographing device, wherein the processor is further configured to: search a relationship table of preset times and focus ranges based on the obtained operation time, thereby obtaining a focus range corresponding to the obtained operation time; and send the obtained focus range to the driver; and using the driver to control the motor to adjust the distance between the lens and the image sensor based on the obtained focus range, wherein the distance is within the obtained focus range.

In some embodiments, acquiring the operation time of the photographing device using the processor includes: acquiring, using the processor, the operation time of the photographing device based on a preset time interval.

In some embodiments, the focus range satisfies the following formula: Step_bond=Step_bond intnd+k·d, wherein the Step_bond is the focus range, the Step_bond intnd is an initial value of the focus range of the photographing device, d is the operation time, and k is a slope value associated with the photographing device.

In some embodiments, obtaining the focus range corresponding to the obtained operation time further includes: obtaining, using the processor, the corresponding d and k values from the relationship table based on the obtained operation time; and computing the focus range based on the obtained d and the k values.

According to another aspect of the disclosure, a photographing device capable of performing precise focusing is disclosed, the photographing device comprising: a lens; an image sensor; a motor, wherein the motor is configured to adjust a distance between the lens and the image sensor; a driver, wherein the driver is configured to drive the motor; and a processor, wherein the processor is coupled to the image sensor and the driver, respectively, wherein the processor is configured to: obtain an operation time of the photographing device; search a relationship table of preset times and focus ranges based on the obtained operation time, thereby obtaining a focus range corresponding to the obtained operation time; and send the obtained focus range to the driver; and wherein the driver is further configured to control the motor to adjust the distance between the lens and the image sensor based on the obtained focus range, wherein the distance is within the obtained focus range.

In some embodiments, the processor is further configured to obtain the operation time of the photographing device based on a preset time interval.

In some embodiments, the focus range satisfies the following formula: Step_bond=Step_bond intnd+k·d, wherein Step_bond is the focus range, Step_bond intnd is an initial value of the focus range of the photographing device, d is the operation time, and k is a slope value associated with the photographing device.

In some embodiments, the processor is further configured to: obtain the corresponding d and k values from the relationship table based on the obtained operation time; and compute the focus range based on the obtained d and the k values.

According to yet another aspect of the disclosure, a photographing device capable of performing precise focusing is disclosed, comprising: a processor; a read-only memory (ROM); a random access memory (RAM); and a bus, wherein the said processor, the ROM and the RAM are all coupled to the bus; wherein the processor is configured to: obtain an operation time of the photographing device; search a relationship table of preset times and focus ranges based on the obtained operation time, thereby obtaining a focus range corresponding to the obtained operation time; and send the obtained focus range to the driver; and wherein the driver is configured to control the motor to adjust the distance between the lens and the image sensor based on the obtained focus range, wherein the distance is within the obtained focus range; wherein the processor is further configured to obtain the operation time of the photographing device based on a preset time interval, and wherein the focus range satisfies the following formula: Step_bond=Step_bond intnd+k·d, wherein Step_bond is the focus range, Step_bond intnd is an initial value of the focus range of the photographing device, d is the operation time, and k is a slope value associated with the photographing device.

In some embodiments, the processor is further configured to: obtain the corresponding d and k values from the relationship table based on the obtained operation time; and compute the focus range based on the obtained d and the k values.

Advantages of the disclosure may follow. As compared with the prior art, the present disclosure provides that a processor may be configured to obtain the operation time of the photographing device in real time, search the relationship table of preset times and focus range based on the obtained operation time to obtain a focus range corresponding to the obtained operation time; the processor may be configured to send the obtained focus range to a driver, the driver may be configured to adjust the distance between a lens and an image sensor based on the focus range, so that the lens may be located in the focus range, and to adjust the focus range in real time and improve the accuracy of focusing between the lens and the image sensor.

BRIEF DESCRIPTION OF THE DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

The detailed description set forth below is intended as a description of the subject technology with reference to the appended figures and embodiments. It is understood that the embodiments described herein include merely some parts of the embodiments of the present disclosure, but do not include all the embodiments. Based on the embodiments of the present disclosure, all other embodiments that those skilled in the art may derive from these embodiments are within the scope of the present disclosure.

Figure 1:
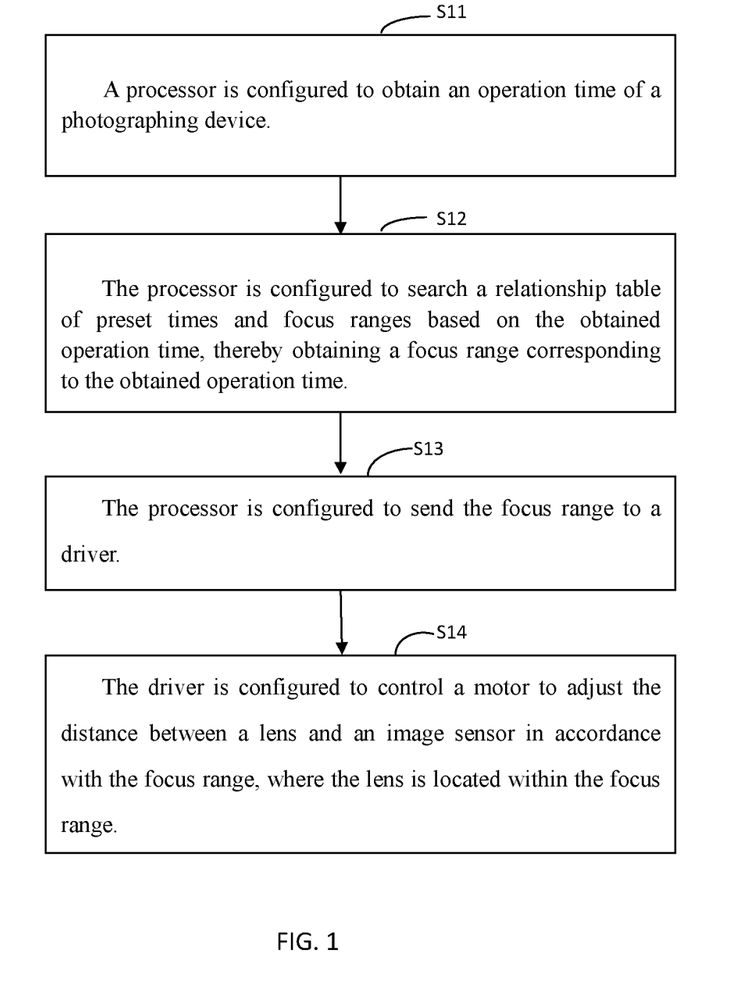
FIG. 1 is a flow diagram illustrating a method for enabling precise focusing according to an embodiment of the disclosure.
Figure 2:
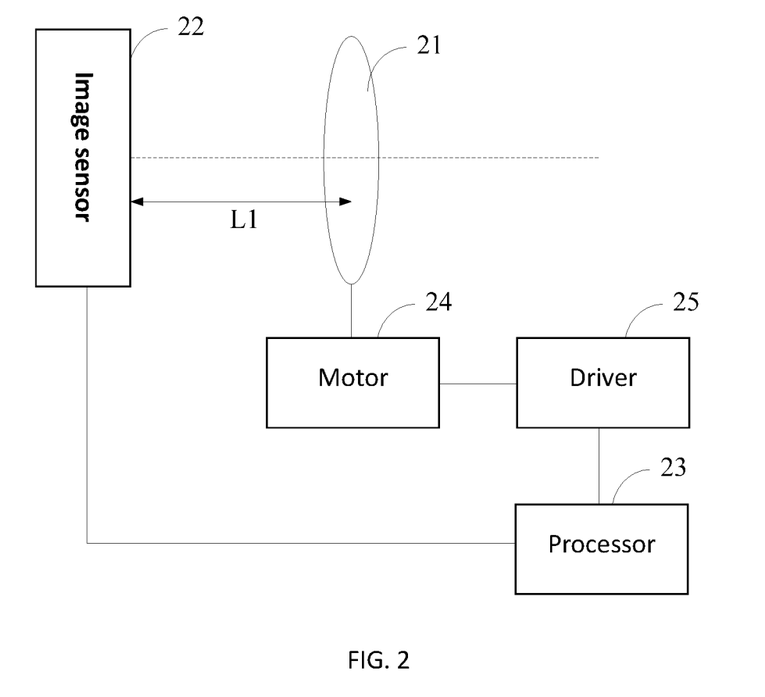
FIG. 2 is a block diagram of a photographing device capable of performing precise focusing according to an embodiment of the disclosure.

Turning to FIG. 1 and FIG. 2. FIG. 1 is a flow diagram illustrating a method for enabling precise focusing according to an embodiment of the disclosure. The method for enabling precise focusing disclosed in the present embodiment may be applied to one or more photographing devices, preferably, such as smart phones, tablet computers, palmtop computers or devices equipped with a photographing function.

As shown in FIG. 2, a photographing device includes a lens 21, an image sensor 22, a processor 23, a motor 24, and a driver 25, where the processor 23 is coupled to the image sensor 22 and the driver 25, respectively. The processor 23 may be configured to obtain one or more images from the image sensor 22. The driver 25 may be configured to drive the motor 24, and where the motor 24 may be configured to adjust a distance L1 between the lens 21 and the image sensor 22 to enable precise focusing for the photographing device.

The method as illustrated may include the following blocks.

At block S11, the processor 23 may be configured to obtain an operation time of the photographing device.

In some embodiments, the processor 23 may be configured to start timing when the photographing device begins photographing or capturing images, to obtain the operation time of the photographing device in real-time.

Preferably, the processor 23 may be configured to obtain the operation time of the photographing device based on a preset time interval. For example, the preset time interval may be 10 seconds, then the processor 23 may be configured to obtain the operation time of the photographing device every 10 seconds, and the operation time of the photographing device may be 10 seconds, 20 seconds, etc.

At block S12, the processor 23 is configured to search a relationship table of preset times and focus ranges based on the obtained operation time, thereby obtaining a focus range corresponding to the obtained operation time.

The details of how to search a relationship table of preset times and focus ranges based on the obtained operation time are as follows:

The photographing device may focus by adjusting the distance L1 between the lens 21 and the image sensor 22 by the motor 24, so that a subject to be captured may be clearly imaged on the image sensor 22, where the lens 21 may move within a certain range. According to Gaussian lens formula as below:

$$1/u + 1/v = 1/f \tag{1}$$

where u is the object distance, v is the image distance, and f is the focal length. The processor 23 may be configured to calculate an appropriate image distance v from the object distance u so that the focus is sharp.

Figure 3:
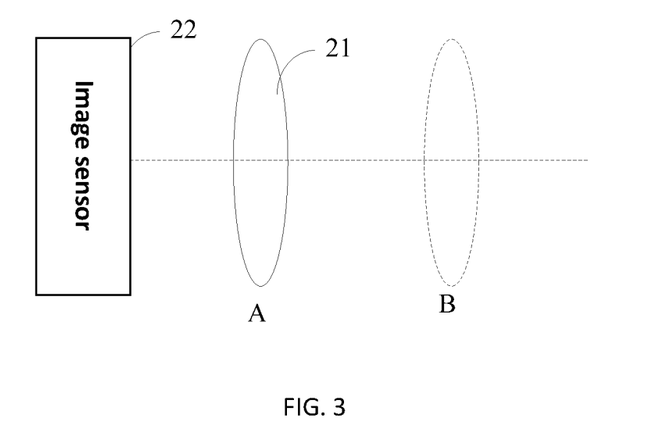
FIG. 3 is a block diagram of a motor adjusting a lens according to the embodiment as illustrated in FIG. 2.

As shown in FIG. 3, the motor 24 may be configured to adjust the lens 21 in a path from position A at the left side to position B at the right side. The driving force of the motor 24 may be represented in a form of current. For example, the motor 24 may be configured to adjust the lens 21 from position A to position B, and motor 24 may need 100 mA current for running 2 um. The driving force of the motor 24 may be converted to a code value, where 100 mA current may be converted to 1023, e.g., from 0 to 1023, there are in total 1024 code values. When the motor 24 is configured to adjust lens 21 for running 1 um, that may be 512 code values.

The lens 21 may be located at position B that is the default position of the lens 21, which is the infinity end, the corresponding code for the infinity end of is infinity_dac. The closest position where the lens 21 is capable of photographing is at the macro end (e.g., position A), and the corresponding code for the macro end is macro_dac. In order to adjust lens 21 to a sharp focusing position, the lens 21 may only need to search between the infinity end and the macro end and the search range Step_bond is the focus range, that is:

$$\text{Step\_bond} = \text{macro\_dac} - \text{infinity\_dac} \tag{2}$$

In some embodiments, temperature of the photographing device may increase when the operation time of the photographing device increases, resulting in one or more changes of the code value for infinity_dacand the code value for macro_dac.

The processor 23 may be configured to compute Step_bond of a plurality of photographing devices over time, and the focus range Step_bond may satisfy the following formula:

$$\text{Step\_bond} = \text{Step\_bond intnd} + kd \qquad (3)$$

In some embodiments, Step_bond intnd is an initial value of the focus range of the photographing device, d is the operation time, and k is a slope value associated with the photographing device.

The processor 23 may be configured to compute the difference between Step_bond_new which changes over time for each photographing device and the initial value Step_bond intnd of each photographing device. For example, Step_bond_new=new1; new2; new3; new4; . . . ; Step_bond intnd=initial1; initial2; etc. The processor 23 may be configured to obtain the difference between Step_bond_new and the initial value Step_bond intnd as the difference between the slope value k and the operation timed.

Figure 4:
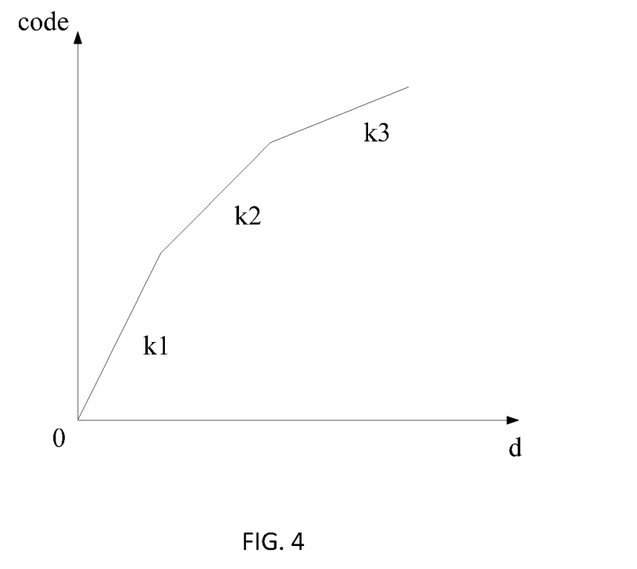
FIG. 4 is a coordinate diagram of the photographing device according to the embodiment as illustrated in FIG. 1.

The code value of each photographing device may be different due to the variations in the production process of each photographing device. The processor 23 may be configured to further compute the difference between new1 and new2; between new2 and new3; between new3 and new4; . . . and between newn and newn+1. For example, the difference between newn and newn+1 may be the differential value between newn and newn+1. The processor 23 may be configured to predefine a threshold and compare the threshold to the difference between newn and newn+1. If processor 23 determines that the difference between newn and newn+1 is less than or equal to the threshold, then processor 23 may be configured to keep newn and newn+1. If the processor 23 determines that the difference between newn and newn+1 is greater than the threshold, the processor 23 may be configured to delete newn+1, and may obtain a new set of data, which is represented on the coordinate system, as shown in FIG. 4. The abscissa of the coordinate system may be the operation time d, and the ordinate of the coordinate system may be the code value of the photographing device. Further, a plurality of k values and d values may be calculated based on the variations over time, such as k1, k2 and k3 as shown in FIG. 4.

Figure 5:
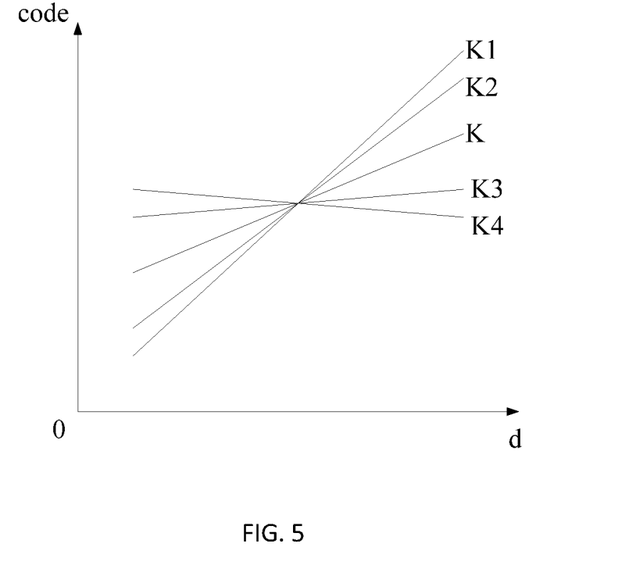
FIG. 5 is a coordinate diagram of a plurality of photographing devices according to the embodiment as illustrated in FIG. 1.

The processor 23 may be configured to obtain a relationship between the slope value k and d of other photographing devices based on the disclosure as described above. For example, K1, K2, K3, and K4 may be the slope of four photographing devices, respectively, as shown in FIG. 5. The processor 23 may be configured to fit the slopes in multiple sections of each photographing device into one slope based on the least squares method. For example, the processor 23 may be configured to fit k1, k2 and k3 in FIG. 4 into slopes K1, K2, and K3, as well as a K4 using the same method. The processor 23 may be configured to further fit a final slope K by deleting the maximum and minimum slope of discrete points through Average Formula Method, i.e., the processor 23 may be configured to fit K1, K2, K3, and K4 into slope K, as shown in FIG. 5.

The processor 23 may be configured to obtain different focus ranges depending on the operation time of the photographing device and corresponding different k and d values, and may store the operation time of the photographing device and the focus range of the photographing device in a relationship table of preset times and focus ranges. In some embodiments, the processor 23 may be configured to obtain a corresponding value of d and k from the relationship table based on the time, and calculate the focus range based on the value of d and the value of k.

The processor 23 may be configured to search the relationship table of preset times and focus range based on the obtained operation time, that is, the processor 23 may be configured to match the operation time of the photographing device with the relationship table, and to obtain the focus range.

At block S13, the processor 23 is configured to send the focus range to the driver 25.

At block S14, the driver 25 is configured to control motor 24 to adjust the distance between the lens 21 and the image sensor 22 in accordance with the focus range, where the lens 21 is located within the focus range.

The processor 23 of the present embodiment may be configured to search the relationship table of preset times and focus range based on the obtained operation time to obtain a focus range corresponding to the obtained operation time. The driver 25 may be configured to control the motor 24 to adjust the distance between the lens 21 and the image sensor 22 based on the focus range, so that the lens 21 may be located in the focus range, and to adjust the focus range in real time and improve the accuracy of focusing between the lens 21 and the image sensor 22.

A photographing device capable of performing precise focusing is provided according to an embodiment of the disclosure, which is described base on the method for enabling precise focusing according to an embodiment of the disclosure. As shown in FIG. 2, the photographing device includes the lens 21, the image sensor 22, the processor 23, the motor 24, and the driver 25, where the processor 23 may be coupled to the image sensor 22 and the driver 25, respectively. The processor 23 may be configured to obtain one or more images from the image sensor 22. The driver 25 may be configured to drive the motor 24, and where the motor 24 may be configured to adjust a distance L1 between the lens 21 and the image sensor 22 to enable precise focusing for the photographing device.

The processor 23 may be configured to obtain the operation time of the photographing device in real time; that is; the processor 23 may be configured to start counting the time when the photographing device begins photographing or capturing an image, to obtain the operation time of the photographing device in real time.

The processor 23 may be configured to search a relationship table of preset times and focus ranges based on the obtained operation time, thereby obtaining a focus range corresponding to the obtained operation time.

The processor 23 may be configured to send the obtained focus range to the driver 25.

The driver 25 may be configured to control the motor 24 to adjust the distance between the lens 21 and the image sensor 22 in accordance with the focus range, where the lens 21 is located within the focus range.

The processor 23 of the present embodiment may be configured to search the relationship table of preset times and focus range based on the obtained operation time to obtain a focus range corresponding to the obtained operation time. The driver 25 may be configured to control the motor 24 to adjust the distance between the lens 21 and the image sensor 22 based on the focus range, so that the lens 21 may be located in the focus range, and to adjust the focus range in real time and improve the accuracy of focusing between the lens 21 and the image sensor 22.

Figure 6:
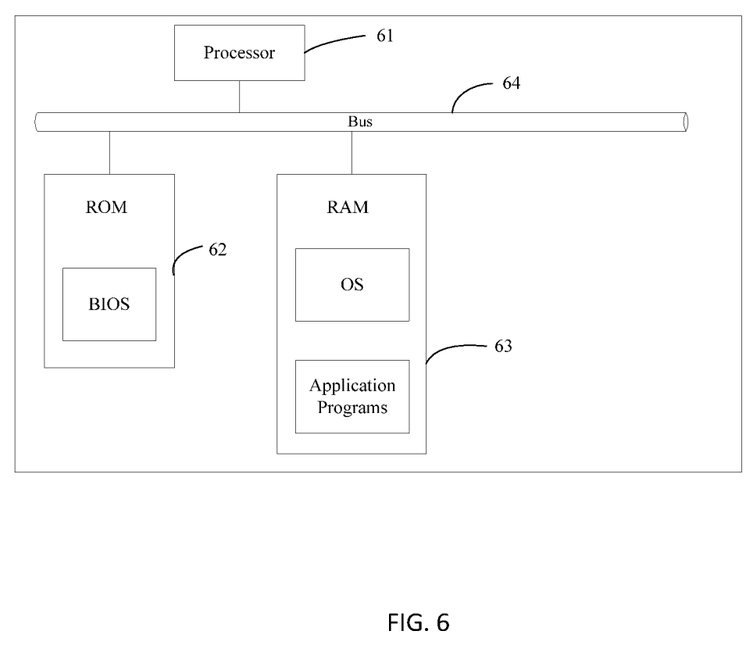
FIG. 6 is a block diagram of a photographing device capable of performing precise focusing according to another embodiment of the disclosure.

Turning to FIG. 6, FIG. 6 is a block diagram of a photographing device capable of performing precise focusing according to another embodiment of the disclosure. The photographing device capable of performing precise focusing of the present embodiment includes a processor 61, a Read-Only Memory (ROM) 62, a Random-access Memory (RAM) 63, and a bus 64.

The processor 61 may be configured to control the operation of data interaction processing, and the processor 61 may be referred to as a CPU (Central Processing Unit). The processor 61 may include an integrated circuit chip that has signal processing capability. The processor 61 may also include a general purpose processor, a digital signal processor (DSP), an application specific integrated circuit (ASIC), a field programmable gate array (FPGA) or other programmable logic devices, discrete gates, or transistor logic devices and discrete hardware components. A general purpose processor may include a microprocessor, or the processor may also be of any conventional processor or the like.

The memory may include Read-Only Memory 62 and Random-access Memory 63, to provide instructions and data to processor 61. A portion of the memory may also include a non-volatile random access memory (NVRAM).

The various components of the data interaction processing device may be coupled together via the bus 64. The bus 64 may include, other than the data bus, a power bus, a control bus, a status signal bus, and the like. For the sake of clarity, the various buses herein are all labeled as the bus 64 in the figure.

The memory may store the following components, executable modules or data structures, or a subset thereof, or an expanded set thereof: one or more operating instructions including one or more operating instructions for various operations, and one or more operating systems including one or more system programs for implementing one or more basic services, as well as handling one or more hardware-based tasks.

In this embodiment of the present disclosure, the processor 61 may be configured to perform the following operations by invoking one or more operating instructions stored in the memory (e.g., one or more operating instructions may be stored in the operating system).

The processor 61 may be configured to obtain the operation time of the photographing device in real time.

The processor 61 may be configured to search a relationship table of preset times and focus ranges based on the obtained operation time, thereby obtaining a focus range corresponding to the obtained operation time.

The processor 61 may be configured to send the obtained focus range to the driver 25.

As described above, the present disclosure provides that a processor may be configured to obtain the operation time of the photographing device in real time, search the relationship table of preset times and focus range based on the obtained operation time to obtain a focus range corresponding to the obtained operation time; the processor may be configured to send the obtained focus range to a driver, the driver may be configured to adjust the distance between a lens and an image sensor based on the focus range, so that the lens may be located in the focus range, and to adjust the focus range in real time and improve the accuracy of focusing between the lens and the image sensor.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A focusing method being used in a photographing device, the photographing device comprising a lens, an image sensor, a processor, a motor, and a driver, wherein the processor is coupled to the image sensor and the driver, respectively, wherein the driver is configured to drive the motor, and wherein the motor is configured to adjust a distance between the lens and the image sensor, the method comprising:
   obtaining, using the processor, an operation time of the photographing device, wherein the processor is further configured to:
   search a relationship table of preset times and focus ranges based on the obtained operation time, thereby obtaining a focus range corresponding to the obtained operation time; and
   send the obtained focus range to the driver; and
   using the driver to control the motor to adjust the distance between the lens and the image sensor based on the obtained focus range, wherein the distance is within the obtained focus range;
   the focus range satisfies the following formula:

$$\text{Step\_bond} = \text{Step\_bond intnd} + k \cdot d,$$

wherein the Step_bond is the focus range, the Step_bond intnd is an initial value of the focus range of the photographing device, d is the operation time, and k is a slope value associated with the photographing device.

2. The method according to claim 1, wherein the obtaining the operation time comprising:
   acquiring, using the processor, the operation time of the photographing device based on a preset time interval.

3. The method according to claim 1, wherein the obtaining the focus range corresponding to the obtained operation time further comprises:
   obtaining, using the processor, the corresponding d and k values from the relationship table based on the obtained operation time; and
   computing the focus range based on the obtained d and the k values.

4. The method according to claim 1, wherein the processor is configured to start timing when the photographing device begins photographing or capturing images, to obtain the operation time of the photographing device in real-time.

5. A photographing device capable of performing precise focusing, the photographing device comprising:
   a lens;
   an image sensor;
   a motor configured to adjust a distance between the lens and the image sensor;
   a driver configured to drive the motor; and
   a processor coupled to the image sensor and the driver, respectively, wherein the processor is configured to:
   obtain an operation time of the photographing device;
   search a relationship table of preset times and focus ranges based on the obtained operation time, thereby obtaining a focus range corresponding to the obtained operation time; and
   send the obtained focus range to the driver; and
   wherein the driver is further configured to control the motor to adjust the distance between the lens and the image sensor based on the obtained focus range, wherein the distance is within the obtained focus range;
   the focus range satisfies the following formula:

$$\text{Step\_bond} = \text{Step\_bond intnd} + k \cdot d,$$

wherein the Step_bond is the focus range, the Step_bond intnd is an initial value of the focus range of the photographing device, d is the operation time, and k is a slope value associated with the photographing device.

6. The photographing device according to claim 5, wherein the processor is further configured to obtain the operation time of the photographing device based on a preset time interval.

7. The photographing device according to claim 5, wherein the processor is further configured to:
   obtain the corresponding d and k values from the relationship table based on the obtained operation time; and
   compute the focus range based on the obtained d and the k values.

8. The photographing device according to claim 5, wherein the processor is configured to start timing when the photographing device begins photographing or capturing images, to obtain the operation time of the photographing device in real-time.

9. A photographing device comprising:
   a processor;
   a read-only memory (ROM);
   a random access memory (RAM); and
   a bus,
   wherein the said processor, the ROM and the RAM are all coupled to the bus;
   wherein the processor is configured to:
   obtain an operation time of the photographing device;
   search a relationship table of preset times and focus ranges based on the obtained operation time, thereby obtaining a focus range corresponding to the obtained operation time; and
   send the obtained focus range to the driver; and
   wherein the driver is configured to control the motor to adjust the distance between the lens and the image sensor based on the obtained focus range, wherein the distance is within the obtained focus range;
   wherein the processor is further configured to obtain the operation time of the photographing device based on a preset time interval, and
   wherein the focus range satisfies the following formula:
   $$\text{Step\_bond} = \text{Step\_bond intnd} + k \cdot d,$$
   wherein the Step_bond is the focus range, the Step_bond intnd is an initial value of the focus range of the photographing device, d is the operation time, and k is a slope value associated with the photographing device.

10. The photographing device according to claim 9, wherein the processor is further configured to:
    obtain the corresponding d and k values from the relationship table based on the obtained operation time; and
    compute the focus range based on the obtained d and the k values.

11. The photographing device according to claim 9, wherein the processor is configured to start timing when the photographing device begins photographing or capturing images, to obtain the operation time of the photographing device in real-time.

* * * * *